United States Patent
Zheng et al.

(10) Patent No.: US 10,733,008 B2
(45) Date of Patent: Aug. 4, 2020

(54) METHOD, DEVICE AND COMPUTER READABLE STORAGE MEDIUM FOR MANAGING A VIRTUAL MACHINE

(71) Applicant: EMC IP Holding Company LLC, Hopkinton, MA (US)

(72) Inventors: Qingxiao Zheng, Chengdu (CN); Derro Dening Xu, Chengdu (CN); Walter Lei Wang, Shanghai (CN); Baoli Guo, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 182 days.

(21) Appl. No.: 15/954,674

(22) Filed: Apr. 17, 2018

(65) Prior Publication Data

US 2018/0300167 A1    Oct. 18, 2018

(30) Foreign Application Priority Data

Apr. 17, 2017  (CN) .......................... 2017 1 0249893

(51) Int. Cl.
   *G06F 9/455*    (2018.01)

(52) U.S. Cl.
   CPC .. *G06F 9/45558* (2013.01); *G06F 2009/4557* (2013.01); *G06F 2009/45595* (2013.01)

(58) Field of Classification Search
   None
   See application file for complete search history.

(56) References Cited

U.S. PATENT DOCUMENTS

| 8,826,033 | B1 | 9/2014 | Krishnaprasad et al. |
| 9,262,188 | B1 | 2/2016 | Yang et al. |
| 10,146,574 | B1 | 12/2018 | Krivenok et al. |
| 10,235,196 | B1 | 3/2019 | Natanzon et al. |
| 10,565,064 | B2 | 2/2020 | Sharma |
| 2015/0347170 | A1* | 12/2015 | Mohammed .............. G06F 8/65 718/1 |

\* cited by examiner

*Primary Examiner* — Qing Yuan Wu
(74) *Attorney, Agent, or Firm* — BainwoodHuang

(57) ABSTRACT

Embodiments of the present disclosure relate to a method, device and computer readable storage medium for managing a virtual machine. For example, a method is provided, comprising: obtaining identification information of a target process; determining a virtual machine running the target process from a plurality of virtual machines based on the identification information of the target process; and placing the determined virtual machine into a virtual machine group.

17 Claims, 5 Drawing Sheets

METHOD, DEVICE AND COMPUTER READABLE STORAGE MEDIUM FOR MANAGING A VIRTUAL MACHINE

RELATED APPLICATIONS

This application claim priority from Chinese Patent Application Number CN201710249893.7, filed on Apr. 17, 2017 at the State Intellectual Property Office, China, titled "METHOD, APPARATUS, AND COMPUTER READABLE STORAGE MEDIUM FOR MANAGING VIRTUAL MACHINES" the contents of which is herein incorporated by reference in its entirety.

FIELD

Embodiments of the present disclosure generally relate to management of a virtual machine, and more specifically, to a method and device for grouping the virtual machines.

BACKGROUND

A virtual machine refers to a software-simulated complete computer system having a complete hardware system function and running in a completely isolated environment. For example, in the case of running a large amount of virtual machines in a cloud platform, challenging is how to group the virtual machines to achieve uniform management and distribution of the virtual machines, thus effectively saving configuration time.

SUMMARY

In general, embodiments of the present disclosure provide a method, device and computer readable storage medium for managing a virtual machine.

According to a first aspect of the present disclosure, a method of managing a virtual machine is provided. The method comprises: obtaining identification information of a target process; determining a virtual machine running the target process from a plurality of virtual machines based on the identification information of the target process; and placing the determined virtual machine into a virtual machine group.

In some embodiments, the obtaining identification information of a target process comprises: obtaining identification information of a target application; determining a key process of the target application based on the identification information of the target application, the key process being essential for running the target application; and extracting identification information of the key process as the identification information of the target process.

In some embodiments, the extracting identification information of the key process comprises: extracting the identification information of the key process based on metadata of the target application, the metadata indicating the key process of the target application.

In some embodiments, the determining a virtual machine running the target process from a plurality of virtual machines based on the identification information of the target process comprises: obtaining identification information of a process running in a virtual machine among the plurality of virtual machines; comparing the identification information of the process with the identification information of the target process; and in response to the identification information of the process matching the identification information of the target process, determining that the virtual machine among the plurality of virtual machines runs the target process.

In some embodiments, the obtaining identification information of a process comprises: obtaining the identification information of the process by obtaining the process running in the virtual machine among the plurality of virtual machines via an application program interface.

In some embodiments, the placing the determined virtual machine into a virtual machine group comprises: assigning the virtual machine with a tag specific to the group.

In some embodiments, the assigning the virtual machine with a tag comprises: generating the tag based on the identification information of the target process; and adding the tag to the determined virtual machine.

According to a second aspect of the present disclosure, a device for managing a virtual machine is provided. The device comprises at least one processing unit and at least one memory. The at least one memory couples to the at least one processing unit and stores instructions executed by the at least one processing unit. The instructions when executed by the at least one processing unit cause the device to execute acts comprising: obtaining identification information of a target process; determining a virtual machine running the target process from a plurality of virtual machines based on the identification information of the target process; and placing the determined virtual machine into a virtual machine group.

In some embodiments, the obtaining identification information of a target process comprises: obtaining identification information of a target application; determining a key process of the target application based on the identification information of the target application, the key process being essential for running the target application; and extracting identification information of the key process as the identification information of the target process.

In some embodiments, the extracting identification information of the key process comprises: extracting the identification information of the key process based on metadata of the target application, the metadata indicating the key process of the target application.

In some embodiments, the determining a virtual machine running the target process from a plurality of virtual machines based on the identification information of the target process comprises: obtaining identification information of a process running in a virtual machine among the plurality of virtual machines; comparing the identification information of the process with the identification information of the target process; and in response to the identification information of the process matching the identification information of the target process, determining that the virtual machine among the plurality of virtual machines runs the target process.

In some embodiments, the obtaining identification information of a process comprises: obtaining the identification information of the process by obtaining the process running in the virtual machine among the plurality of virtual machines via an application program interface.

In some embodiments, the placing the determined virtual machine into a virtual machine group comprises: assigning the virtual machine with a tag specific to the group.

In some embodiments, the assigning the virtual machine with a tag comprises: generating the tag based on the identification information of the target process; and adding the tag to the determined virtual machine.

According to a third aspect of the present disclosure, a computer readable storage medium is provided. The computer readable storage medium has computer readable program instructions stored thereon, the computer readable program instructions when executed by a processing unit causing the processing unit to implement any step of the method according to the first aspect of the present disclosure.

Though the description below, it would be understood that the present disclosure provides a solution for facilitating dynamic grouping of the virtual machines. The objective of the present disclosure is to dynamically group the virtual machines based on a process, so as to improve the virtual machine configuration and the management efficiency.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description of the example embodiments described herein with reference to the accompanying drawings, the above and other objectives, features, and advantages of the present disclosure will become more apparent, and in the example embodiments of the present disclosure, the same or similar reference symbols refer to the same or similar elements.

DETAILED DESCRIPTION OF EMBODIMENTS

Figure 1:
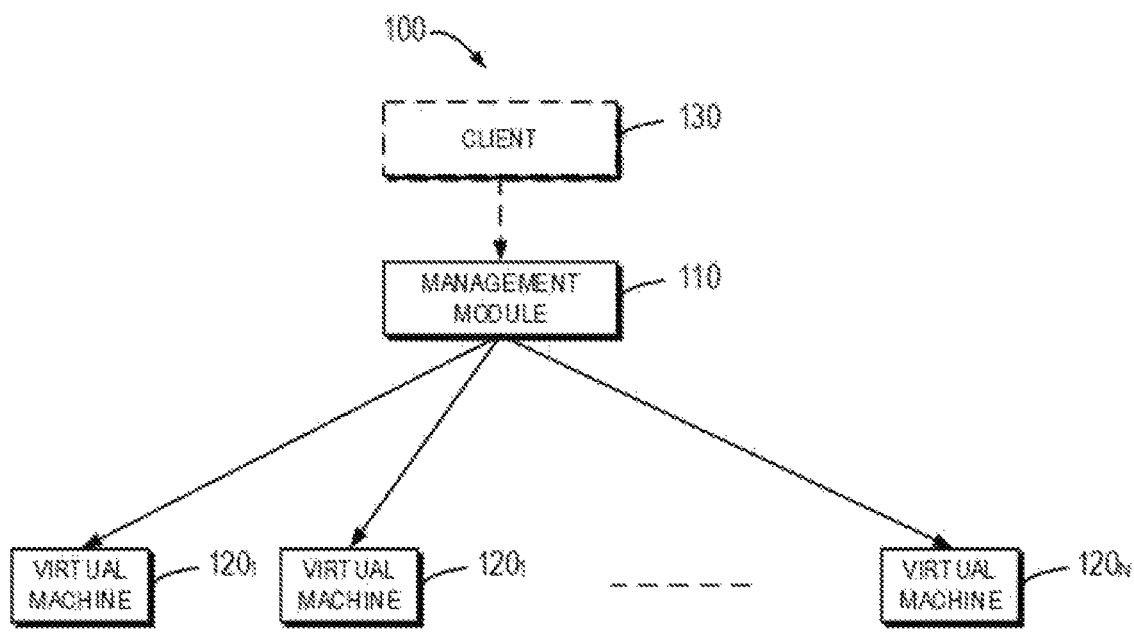
FIG. 1 illustrates a block diagram of a system 100 for processing data according to embodiments of the present disclosure.

Preferred embodiments of the present disclosure will now be described with reference to the drawings. Though the drawings illustrate preferred embodiments of the present disclosure, it should be appreciated that the present disclosure may be implemented in various forms but should not be confined to embodiments illustrated herein. Instead, these embodiments are provided to make the present disclosure clearer and more complete, and to convey the scope of the present disclosure exactly to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" indicates "at least one another embodiment." The terms "first," "second," and the like may refer to different or same objects. Other definitions, explicit and implicit, may be included below.

Typically, when an end user attempts to perform any specific operation on a batch of target virtual machines in a cloud platform, the end user needs to find all virtual machines containing a specific application, and group the virtual machines based on specific virtual machine attributes (such as name, folder, tag, etc. of the virtual machine). For example, in a conventional dynamic strategy, the virtual machines needed may be filtered by rules. In order to select at least one virtual machine using the dynamic strategy, the end user first needs to manually find all virtual machines containing the specific application, and set or add specific virtual machine attributes for the virtual machines to group them. Then, the end user may create rules to select at least one virtual machine based on the specific virtual machine attributes.

However, for the end user, it is troublesome to manually assign a large amount of virtual machines to one or more groups in a large system, because all virtual machines containing the specific application are to be filtered and assigned with similar attributes. For example, in the conventional dynamic strategy, the rules for selecting at least one virtual machine are dependent on predefined specific virtual machine attributes. Therefore, prior to creating the rules, the end user has to manually set the specific virtual machine attributes for the virtual machines. Once there exists thousands of virtual machines, it will be difficult to find out all the virtual machines running the specific application and to manually set the specific virtual machine attributes. In these circumstances, the conventional techniques are unable to effectively save configuration time.

Besides, in the case that manually or dynamically assigned virtual machine groups exist, due to hardware crash, unexpected unload of a specific process, etc., some virtual machines in the existed virtual machine groups are probably no longer in use. However, the end user or the system administrator hardly filters out these virtual machines from the virtual machine groups in use, such that a specific operation performed on the virtual machine group is applied to the virtual machines no longer in use. In these circumstances, the conventional techniques may lead to potential errors.

In order to at least solve the above problems and other potential problems, a solution for processing data is proposed in example embodiments of the present disclosure. In this solution, identification information of a target process is obtained, a virtual machine running the target process is determined from a plurality of virtual machines based on the identification information of the target process, and the determined virtual machine is assigned to a virtual machine group. In this way, the virtual machines are dynamically grouped based on the identification information of the target process, so as to prevent the end user from manually setting the specific virtual machine attributes for the virtual machines to group the virtual machines. In addition, since the virtual machines running the target process are dynamically grouped, the specific operation performed on the virtual machine groups may be prevented from being applied to the virtual machines no longer in use. Accordingly, a solution for improving the virtual machine configuration and the management efficiency and reducing the potential errors is provided.

FIG. 1 illustrates a block diagram of a system 100 for processing data according to embodiments of the present disclosure. It would be appreciated that the structure and function of the system 100 are described for example purpose only, without implying any restriction to the scope of the present disclosure. The embodiments of the present disclosure may be embodied in different structures and/or functions.

As shown in FIG. 1, the system 100 may include: a management module 110, virtual machines $120_1$-$120_N$ (hereinafter collectively referred to as virtual machines 120) and a client 130, where the client 130 is optional. The management module 110 may obtain the identification information of the target process. The identification information is for example process name information, process identity information, etc.

In some embodiments, the management module 110 may obtain the identification information of the target process locally. In some other embodiments, the management module 110 may obtain the identification information of the target process from the client 130. For example, the user may input the identification information of the target process on the client 130. Alternatively, the client 130 may present to the user the identification information of a specific target process for selection. In this case, the user may set the presented identification information of the specific target process.

Alternatively, the management module 110 may generate the identification information of the target process based on predefined rules. For example, the rules may specify that when the number of virtual machines in the system 100 is above a predetermined threshold, the virtual machines running the specific process are to be grouped. In this case, when the management module 110 detects that the number of the virtual machines is above the predetermined threshold, the management module 110 may generate the identification information of the specific process.

The management module 110 may determine the virtual machines running the target process from the virtual machines 120 based on the obtained identification information of the target process. In some embodiments, for example, a software development kit (SDK) of a cloud platform provides an application program interface (API) for listing processes in the target virtual machines. The management module 110 may determine via the API the virtual machines running the target process from the virtual machines 120.

The management module 110 may place the determined virtual machines into a virtual machine group. For example, if the management module 110 determines that the virtual machine $120_1$ and the virtual machine $120_2$ run the target process, the management module 110 may place the virtual machine $120_1$ and the virtual machine $120_2$ into one virtual machine group. This enables automatic and dynamical grouping of the target virtual machines by detecting the information of the process running in the virtual machines.

In some embodiments, the client 130 may modify the generated virtual machine group. For example, the client 130 may determine whether the virtual machine group satisfies specific requirements. In the case that the virtual machine group does not satisfy the specific requirements, the client 130 may delete specific virtual machines from the virtual machine group and/or add specific virtual machines into the virtual machine group. Moreover, the client 130 may perform the operations needed on the virtual machines in the virtual machine group. This enables further extension of the dynamically generated virtual machine group.

Figure 2:
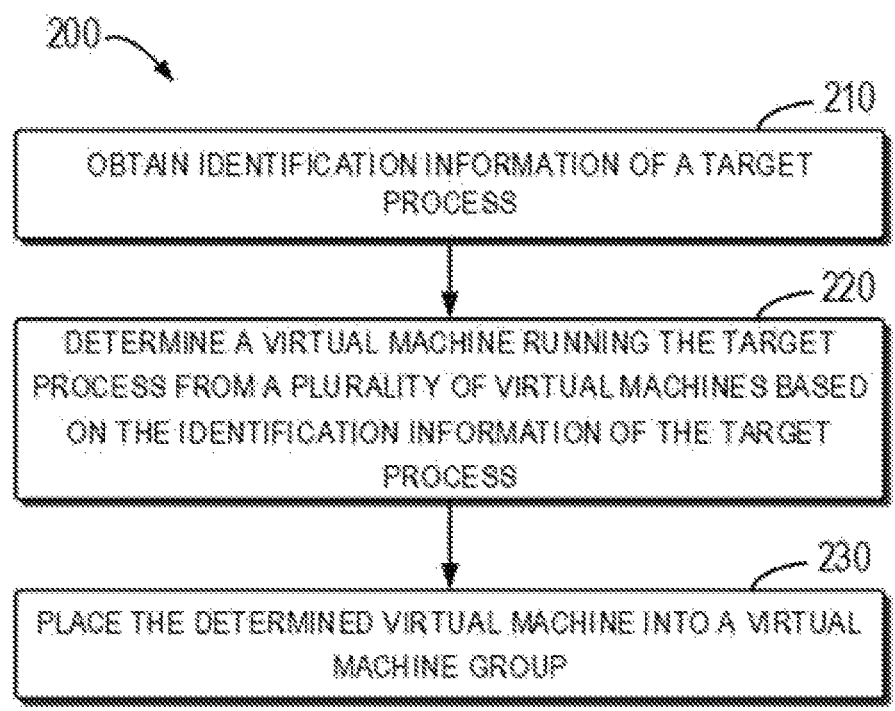
FIG. 2 illustrates a block diagram of a method 200 of processing data according to embodiments of the present disclosure.

FIG. 2 illustrates a flow chart of a method 200 of processing data according to embodiments of the present disclosure. For example, the method 200 may be performed by the management module 110 as shown in FIG. 1. It would be appreciated that the method 200 may further include additional steps not shown and/or may omit the steps shown, and the scope of the present disclosure is not limited in this aspect.

Figure 3:
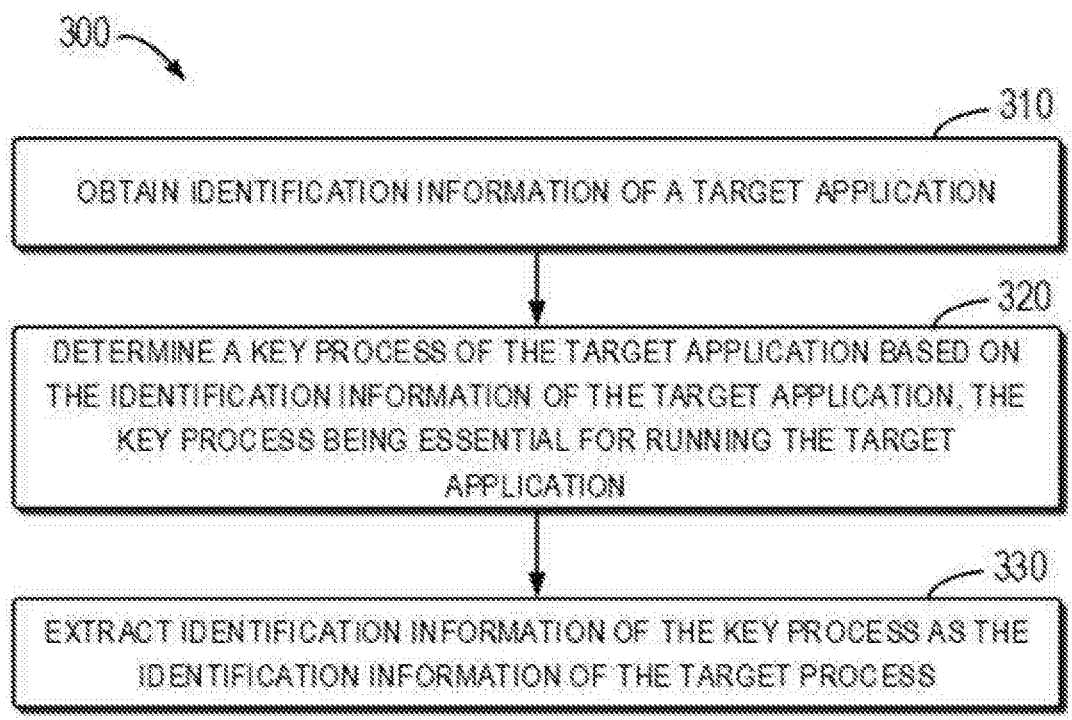
FIG. 3 illustrates a flow chart of a method 300 of obtaining identification information of a target process according to embodiments of the present disclosure.

At 210, the management module 110 obtains the identification information of the target process. In some embodiments, the management module 110 may directly obtain the identification information of the target process. In some other embodiments, the management module 110 may obtain the identification information of the target application and convert the identification information of the target application into the identification information of the target process. A method 300 of obtaining the identification information of the target process based on the identification information of the target application will be described below with reference to FIG. 3.

At 310, the management module 110 obtains the identification information of the target application. At 320, the management module 110 determines a key process of the target application based on the identification information of the target application. The key process is essential for running the target application, and therefore may be used for identifying the target application. For example, the management module 110 may generate the mapping between the application and its key process from for example release notes of the application. The management module 110 may determine the key process of the target application based on the mapping using the identification information of the target application.

At 330, the management module 110 extracts the identification information of the key process as the identification information of the target process. In some embodiments, the management 110 extracts the identification information of the key process based on metadata of the target application. The metadata indicates the key process of the target application. The metadata may be for example the mapping generated from the release notes as described above. By the method 300, the virtual machines may be dynamically grouped based on the application, so as to improve the virtual machine configuration and the management efficiency and to reduce the potential errors.

Returning to FIG. 2, at 220, the management module 110 determines the virtual machines running the target process from a plurality of virtual machines based on the identification information of the target process. In some embodiments, the management module 110 may obtain the identification information of the process running in a virtual machine among the plurality of virtual machines. For example, the management module 110 may obtain the identification information of the process by obtaining the process running in the virtual machine among the plurality of virtual machines via the application program interface. The management module 110 may compare the identification information of the process with the identification information of the target process, and determine that the virtual machine among the plurality of virtual machines runs the target process, in response to the identification information of the process matching the identification information of the target process.

At 230, the management module 110 places the determined virtual machine into a virtual machine group. In some embodiments, the management module 110 may assign the determined virtual machine with a tag specific to the virtual machine group. For example, the management module 110 may generate the tag based on the identification information of the target process, and add the tag to the determined virtual machine. By the method 200, the virtual machines are dynamically grouped based on the process, so as to effectively save the configuration time and reduce the potential errors.

Figure 4:
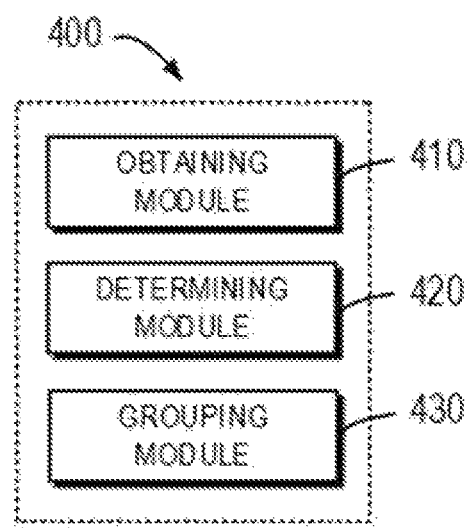
FIG. 4 illustrates a schematic block diagram of an apparatus for processing data according to embodiments of the present disclosure.

FIG. 4 is a schematic block diagram of an apparatus 400 for processing data according to embodiments of the present disclosure. For example, the apparatus 400 may be implemented in the system 100 as shown in FIG. 1, or directly acts as the system 100. As shown, the apparatus 400 includes an obtaining module 410, a determining module 420 and a grouping module 430.

The obtaining module 410 is configured to obtain identification information of a target process. The determining module 420 is configured to determine a virtual machine running the target process from a plurality of virtual machines based on the identification information of the target process. The grouping module 430 is configured to place the determined virtual machine into a virtual machine group.

In some embodiments, the obtaining module 410 includes: an application identification obtaining module configured to obtain identification information of a target application; a key process determining module configured to determine a key process of the target application based on the identification information of the target application, the key process being essential for running the target application; and an extracting module configured to extract identification information of the key process as the identification information of the target process.

In some embodiments, the extracting module includes: a metadata extracting module configured to extract the identification information of the key process based on metadata of the target application, the metadata indicating the key process of the target application, In some embodiments, the determining module 420 includes: a process identification obtaining module configured to obtain identification information of a process running in a virtual machine among the plurality of virtual machines; a comparing module configured to compare the identification information of the process with the identification information of the target process; and a virtual machine determining module configured to, in response to the identification information of the process matching the identification information of the target process, determine that the virtual machine among the plurality of virtual machines runs the target process.

In some embodiments, the process identification obtaining module includes: an interface module configured to obtain the identification information of the process by obtaining the process running in the virtual machine among the plurality of virtual machines via an application program interface.

In some embodiments, the grouping module 430 includes: an assigning module configured to assign the virtual machine with a tag specific to a group.

In some embodiments, the assigning module includes: a tag module configured to generate the tag based on the identification information of the target process, and to add the tag to the determined virtual machine.

The modules included in the apparatus 400 may be implemented in various manners, including software, hardware, firmware or any combination thereof. In one example, one or more modules may be implemented using software and/or firmware, for example, machine executable instructions stored on a storage medium. Besides the machine executable instructions or as an alternative, some or all modules in the apparatus 400 are at least partly implemented by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-Chip systems (SOCs), Complex Programmable Logic Devices (CPLDs), and the like.

Figure 5:
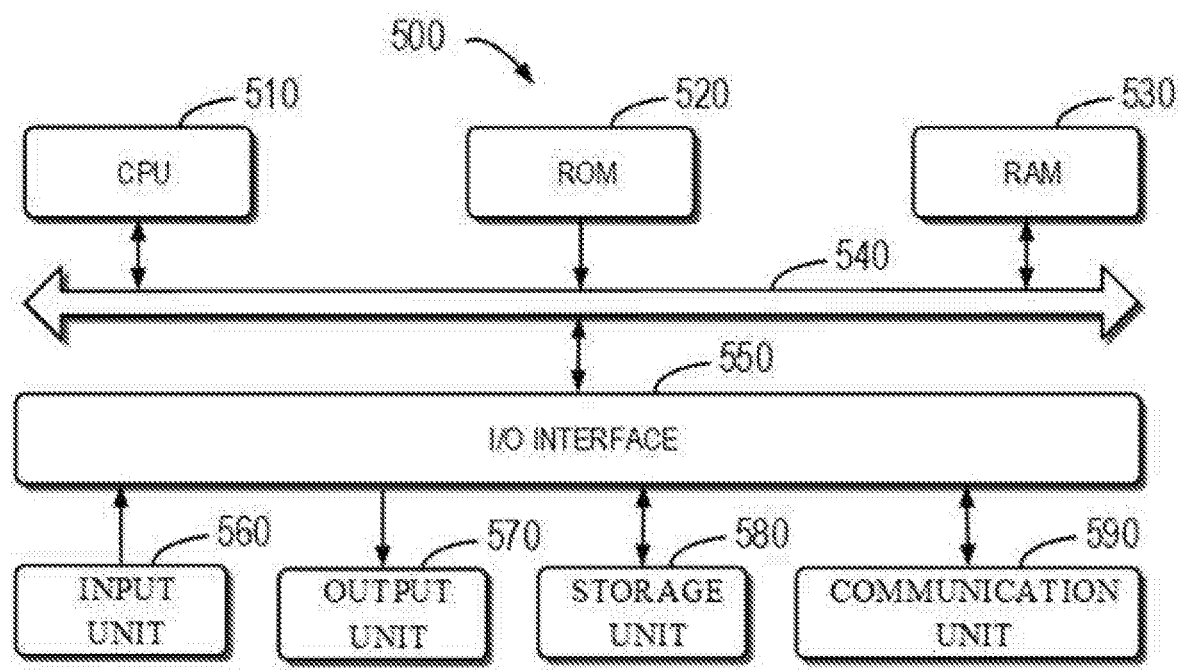
FIG. 5 illustrates a schematic block diagram of a device for implementing embodiments of the present disclosure.

FIG. 5 illustrates a schematic block diagram illustrating an electronic device 500 for implementing embodiments of the present disclosure. As shown, the device 500 includes a central processing unit (CPU) 510 that may perform various appropriate actions and processing based on computer program instructions stored in a read-only memory (ROM) 520 or computer program instructions loaded from a storage unit 580 to a random access memory (RAM) 530. Various programs and data needed for operating the device 500 may be stored in the RAM 530. The CPU 510, ROM 520 and RAM 530 are connected to each other via a bus 540. An input/output (I/O) interface 550 is also connected to the bus 540.

A plurality of components in the device 500 are connected to the I/O interface 550, including: an input unit 560 such as a keyboard, a mouse and the like; an output unit 570 such as various kinds of displays and loudspeakers and the like; a storage unit 580 such as a magnetic disk, an optical disk and the like; and a communication unit 590 such as a network card, a modem, a wireless communication transceiver and the like. The communication unit 590 allows the device 500 to exchange information/data with other devices through a computer network such as the Internet and/or various kinds of telecommunications networks.

Various processes and processing described above, for example the processes 200 and 300, may be executed by the processing unit 510. For example, in some embodiments, the processes 200 and 300 may be implemented as computer software programs tangibly embodied on a machine readable medium, for example the storage unit 580. In some embodiments, part or all of the computer programs may be loaded and/or mounted onto the device 500 via the ROM 520 and/or the communication unit 590. When the computer programs are loaded onto the RAM 530 and executed by the CPU 510, one or more steps of the processes 200 and 300 as described above may be executed. Alternatively, in other embodiments, CPU 510 may be configured to implement the above processes in any other appropriate manner.

It can be seen from the foregoing description that the solution of the present disclosure is applicable to an application that dynamically groups the virtual machines in a virtual machine management system based on the identification information of the target process. The embodiments of the present disclosure improve the virtual machine configuration and the management efficiency by: obtaining identification information of a target process; determining a virtual machine running the target process from a plurality of virtual machines based on the identification information of the target process; and placing the determined virtual machine into a virtual machine group.

The present disclosure may be a method, a device, a system, and/or a computer program product. The computer program product may include a computer readable storage medium having computer readable program instructions stored thereon for carrying out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to a respective computing/processing device from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program instructions for carrying out operations of the present disclosure may be assembly instructions, Instruction-Set-Architecture (ISA) instructions, machine instructions, machine dependent instructions, microcode, firmware instructions, state-setting data, or either source code or object code written in any combination of one or more programming languages, including object oriented programming languages such as Smalltalk, C++ or the like, and conventional procedural programming languages such as the "C" programming language or similar programming languages. The computer readable program instructions may be executed entirely on the user's computer, partly on the user's computer, as a stand-alone software package, partly on the user's computer and partly on a remote computer or entirely on the remote computer or server. In the case regarding the remote computer, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) which may execute the computer readable program instructions may be customized by utilizing state information of the computer readable program instructions, in order to carry out aspects of the present disclosure.

Aspects of the present disclosure are described herein with reference to flowchart and/or block diagrams of methods, devices (systems), and computer program products according to embodiments of the disclosure. It will be understood that each block of the flowchart and/or block diagrams, and combinations of blocks in the flowchart and/or block diagrams, can be implemented by computer readable program instructions.

These computer readable program instructions may be provided to a processing unit of a general purpose computer, special purpose computer, or other programmable data processing apparatus to produce a machine, such that the instructions, when executed via the processing unit of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored thereon includes an article of manufacture including instructions which implement aspects of the functions/acts specified in the flowchart and/or block diagram block or blocks.

The computer readable program instructions may also be loaded onto a computer, other programmable data processing apparatus, or other device to cause a series of operation steps to be performed on the computer, other programmable apparatus or other device to produce a computer implemented process, such that the instructions executed on the computer, other programmable apparatus, or other device implement the functions/acts specified in the flowchart and/or block diagram block or blocks.

The flowcharts and block diagrams in the drawings illustrate the architecture, functionality, and operation of possible implementations of the systems, methods and computer program products according to various embodiments of the present disclosure. In this regard, each block in the flowcharts or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart, and combinations of blocks in the block diagrams and/or flowchart, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:
1. A method of managing a virtual machine, comprising:
obtaining identification information of a target process;
determining an in-use virtual machine running the target process from a plurality of virtual machines based on the identification information of the target process;

determining a non-in-use virtual machine not running the target process from the plurality of virtual machines based on the identification information of the target process; and
dynamically grouping the determined in-use virtual machine into a virtual machine group; and
dynamically grouping the determined non-in-use virtual machine into the virtual machine group,
wherein the obtaining identification information of a target process comprises:
obtaining identification information of a target application;
determining a key process of the target application based on the identification information of the target application, the key process being essential for running the target application; and
extracting identification information of the key process as the identification information of the target process.

2. The method according to claim 1, wherein the extracting identification information of the key process comprises:
extracting the identification information of the key process based on metadata of the target application, the metadata indicating the key process of the target application.

3. The method according to claim 1, wherein the dynamically grouping the determined in-use virtual machine into a virtual machine group comprises:
assigning the in-use virtual machine with a tag specific to the group.

4. The method according to claim 3, wherein the assigning the in-use virtual machine with a tag comprises:
generating the tag based on the identification information of the target process; and
adding the tag to the determined in-use virtual machine.

5. A method of managing a virtual machine, comprising:
obtaining identification information of a target process;
determining an in-use virtual machine running the target process from a plurality of virtual machines based on the identification information of the target process;
determining a non-in-use virtual machine not running the target process from the plurality of virtual machines based on the identification information of the target process;
dynamically grouping the determined in-use virtual machine into a virtual machine group; and
dynamically avoiding grouping the determined non-in-use virtual machine into the virtual machine group,
wherein the determining an in-use virtual machine running the target process from a plurality of virtual machines based on the identification information of the target process comprises:
obtaining identification information of a process running in an in-use virtual machine among the plurality of virtual machines;
comparing the identification information of the process with the identification information of the target process; and
in response to the identification information of the process matching the identification information of the target process, determining that the in-use virtual machine among the plurality of virtual machines runs the target process.

6. The method according to claim 5, wherein the obtaining identification information of a process comprises:
obtaining the identification information of the process by obtaining the process running in the in-use virtual machine among the plurality of virtual machines via an application program interface.

7. A device for managing a virtual machine, comprising:
at least one processing unit; and
at least one memory, coupled to the at least one processing unit and storing machine executable instructions thereon, the instructions when executed by the at least one processing unit causing the device to execute acts comprising:
obtaining identification information of a target process;
determining a virtual machine running the target process from a plurality of virtual machines based on the identification information of the target process; and
placing the determined virtual machine into a virtual machine group,
wherein the obtaining identification information of a target process comprises:
obtaining identification information of a target application;
determining a key process of the target application based on the identification information of the target application, the key process being essential for running the target application; and
extracting identification information of the key process as the identification information of the target process.

8. The device according to claim 7, wherein the extracting identification information of the key process comprises:
extracting the identification information of the key process based on metadata of the target application, the metadata indicating the key process of the target application.

9. The device according to claim 7, wherein the placing the determined virtual machine into a virtual machine group comprises: assigning the virtual machine with a tag specific to the group.

10. The device according to claim 9, wherein the assigning the virtual machine with a tag comprises:
generating the tag based on the identification information of the target process; and
adding the tag to the determined virtual machine.

11. A device for managing a virtual machine, comprising:
at least one processing unit; and
at least one memory, coupled to the at least one processing unit and storing machine executable instructions thereon, the instructions when executed by the at least one processing unit causing the device to execute acts comprising:
obtaining identification information of a target process;
determining a virtual machine running the target process from a plurality of virtual machines based on the identification information of the target process; and
placing the determined virtual machine into a virtual machine group, wherein the determining a virtual machine running the target process from a plurality of virtual machines based on the identification information of the target process comprises:
obtaining identification information of a process running in a virtual machine among the plurality of virtual machines;
comparing the identification information of the process with the identification information of the target process; and
in response to the identification information of the process matching the identification information of the target process, determining that the virtual machine among the plurality of virtual machines runs the target process.

12. The device according to claim 11, wherein the obtaining identification information of a process comprises:
    obtaining the identification information of the process by obtaining the process running in the virtual machine among the plurality of virtual machines via an application program interface.

13. A computer readable storage medium, the computer readable storage medium having computer readable program instructions stored thereon, the computer readable program instructions when executed by a processing unit causing the processing unit to implement the steps of:
    obtaining identification information of a target process;
    determining a virtual machine running the target process from a plurality of virtual machines based on the identification information of the target process; and
    placing the determined virtual machine into a virtual machine group,
    wherein the obtaining identification information of a target process comprises:
        obtaining identification information of a target application;
        determining a key process of the target application based on the identification information of the target application, the key process being essential for running the target application; and
        extracting identification information of the key process as the identification information of the target process.

14. The computer readable storage medium of claim 13, wherein the extracting identification information of the key process comprises:
    extracting the identification information of the key process based on metadata of the target application, the metadata indicating the key process of the target application.

15. The computer readable storage medium of claim 13, wherein the placing the determined virtual machine into a virtual machine group comprises:
    assigning the virtual machine with a tag specific to the group.

16. A computer readable storage medium, the computer readable storage medium having computer readable program instructions stored thereon, the computer readable program instructions when executed by a processing unit causing the processing unit to implement the steps of:
    obtaining identification information of a target process;
    determining a virtual machine running the target process from a plurality of virtual machines based on the identification information of the target process; and
    placing the determined virtual machine into a virtual machine group,
    wherein the determining a virtual machine running the target process from a plurality of virtual machines based on the identification information of the target process comprises:
        obtaining identification information of a process running in a virtual machine among the plurality of virtual machines;
        comparing the identification information of the process with the identification information of the target process; and
        in response to the identification information of the process matching the identification information of the target process, determining that the virtual machine among the plurality of virtual machines runs the target process.

17. The computer readable storage medium of claim 16, wherein the obtaining identification information of a process comprises:
    obtaining the identification information of the process by obtaining the process running in the virtual machine among the plurality of virtual machines via an application program interface.

* * * * *

UNITED STATES PATENT AND TRADEMARK OFFICE
CERTIFICATE OF CORRECTION

PATENT NO. : 10,733,008 B2
APPLICATION NO. : 15/954674
DATED : August 4, 2020
INVENTOR(S) : Qingxiao Zheng et al.

Page 1 of 1

It is certified that error appears in the above-identified patent and that said Letters Patent is hereby corrected as shown below:

Claim 1, Column 11, Line 4, reads "process; and", should read -- process; --

Claim 1, Column 11, Line 7, reads "dynamically grouping the determined non-in-use virtual", should read -- dynamically avoiding grouping the determined non-in-use virtual --

Signed and Sealed this
Twentieth Day of October, 2020

Andrei Iancu
*Director of the United States Patent and Trademark Office*